June 16, 1953   M. WEINBERG   2,642,542
RADIATION PROTECTIVE JACKET
Filed April 16, 1951

INVENTOR.
MARVIN WEINBERG
BY
ATTORNEY

Patented June 16, 1953

2,642,542

UNITED STATES PATENT OFFICE 2,642,542

RADIATION PROTECTIVE JACKET

Marvin Weinberg, New York, N. Y.

Application April 16, 1951, Serial No. 221,257

6 Claims. (Cl. 250—108)

This invention relates to radiation protective jackets and has for its object the provision of a radiation protective jacket which has the capacity of absorbing those rays having a wave length absorbable by the human body but which is transparent to those rays which are not absorbed by the human body.

Another object is to provide a radiation protective jacket which is opaque to radiation having a wave-length absorbed by the human body but transparent to radiation passing freely through the human body.

Still another object is to provide a lightweight radiation protective jacket which is opaque to radiation having a wave-length normally absorbed by the human body but transparent to radiation having a wave length passing without substantial absorption through the human body.

Other objects will be apparent as the invention is more fully hereinafter disclosed.

In accordance with these objects I have devised the radiation protective jacket illustrated in the accompanying drawing which is characterized by being comprised of relatively lightweight material which is opaque to radiation having a wave-length normally absorbed with injurious results by the tissues of the human body but substantially transparent to radiation having a wave-length which is not absorbed by the human body.

It is well recognized by those skilled in the art of radiation that no material is perfectly transparent to rays of whatever great hardness, and no material is perfectly opaque to rays of whatever great wave-length. Likewise, any material is found more or less opaque to rays of a certain wave-length, but is much more transparent to rays of shorter wave-lengths or greater hardness. Hence the terms "opaque," "transparent," "absorbable," "absorbed," and "passing freely through the human body," as hereinafter used in the specification and claims are to be understood as relative terms, the significance of which is chiefly practical. Their precise significance differs continuously over the range from softest to hardest rays. The practical interpretation, of interest here, is concerned with injury to the human tissues which might lead to illness or death.

The problem of protection for the human body from the effects of injurious radiation is greatly simplified by recognition of the fact that recent investigations have demonstrated that the most serious injury and highest mortality due to exposure to X-radiation or gamma radiation are produced by rays passing into the abdominal region and especially radiation affecting the spleen. Generally speaking, such investigations have also shown that radiation having a wavelength to which the body tissue is opaque or absorbent produces most of the injury or damage to the tissue whereas radiation having a wavelength to which the tissue is transparent produces the minimum damage.

In view of these findings the problem of protecting the abdominal regions of humans against radiation damage by means of a protective jacket resolves itself in providing a jacket comprised of material which is opaque to radiation having a wave-length that is absorbed by the abdominal regions of the human body while being transparent to that radiation which passes freely through this region of the body. As the intensity of such radiation and the time interval of exposure to such radiation are variable factors to take into consideration in the solution of this problem, I have concluded that absolute protection against absorbable radiation cannot always be provided and that the main object of such a protective jacket is to provide a sufficient amount of protection for any contemplated maximum intensity for a reasonable time interval as will reduce the intensity of the radiation passing through the jacket to a low level insufficient to cause major damage or injury to the tissues within reasonable limits of weight of jacket.

With this consideration in mind I have designed the jacket illustrated in the drawings, the composition and construction of which will be more fully hereinafter disclosed.

Referring to the drawings.

Figure 1:
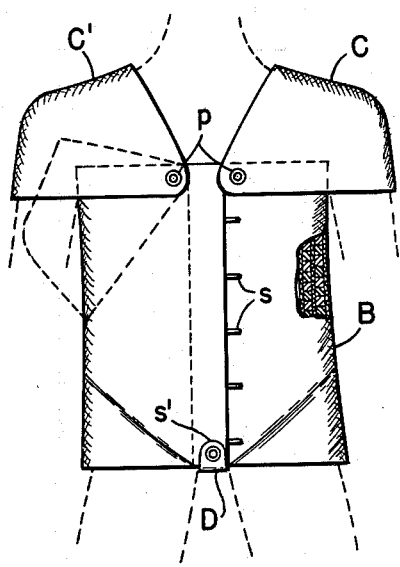
Fig. 1 is a front view of the jacket of the present invention as it appears in position on the wearer.

The jacket structure indicated in Fig. 1 is featured by a body part B having a size adapted to encircle the body of the wearer and to be secured in position by securing means s which may be any one of the means heretofore employed in the art such as snaps, buttons, clips and zippers, the said body part being held or sustained in position by shoulder caps C—C' and restrained against upward movement by crotch strap D which also is secured in position by securing means $s'$ which may, for example, be a snap or button securing means. Shoulder caps C—C' are pivotally connected to the body part B, front and back, by pivoting means $p$ to provide freedom of movement to the arms and shoulders of the wearer.

As constructed, the jacket is designed to cover the chest, abdominal and gonadal regions of the wearer which are most subject to injury and damage by radiation to which the region is opaque or absorbent.

The construction of the jacket to provide a structure and composition which is generally opaque and absorbent to that radiation which is absorbed by the covered region of the body but transparent to body radiation passing freely through the radiation will now be described.

Figure 2:
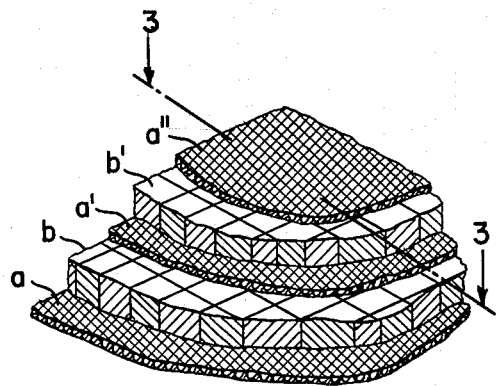
Fig. 2 is an enlarged view of the broken away segment of the jacket shown in Fig. 1.
Figure 4:
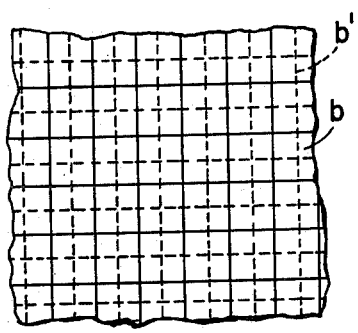
Fig. 4 is a sectional view taken along plane 4—4 of Fig. 3.
Figure 3:
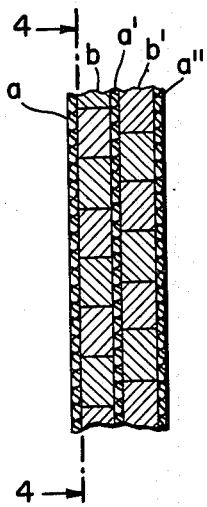
Fig. 3 is a sectional view taken along plane 3—3 of Fig. 2.

In accordance with the present invention, the jacket is comprised of a plurality of layers of materials $a$ and $b$ as indicated in Figs. 2, 3 and 4. Layers $a$, $a'$ and $a''$ may consist of the same or of different woven fabric materials. Layers $b$ and $b'$ consist of substantially the same material and are comprised of a plurality of blocks of the material held in aligned position with the blocks of one layer offset with respect to the other layer to cover the interstices between the blocks in each layer.

Each block of material in layers $b$—$b'$ consists of plaster of Paris ($CaSO_4 \cdot 2H_2O$) containing a mixture of solid phase inorganic compounds which in association or combination with the plaster of Paris is opaque to radiation having the same wave lengths that are absorbed with injurious results by the body tissues. The thickness of each block may be varied widely depending upon the specific composition employed and the extent of radiation absorption desired for the block.

As an example, plaster of Paris alone has a high degree of opaqueness to such harmful radiation and a block having a thickness of approximately one-half inch will reduce the intensity of such harmful radiation to about one-tenth the original intensity. Mineral phosphates, such as calcium phosphate, when incorporated in the plaster of Paris increase the absorption characteristics of the block markedly such that as the amount of the calcium phosphate increases, the thickness of the block may be materially decreased to obtain equivalent opaqueness.

In the selection of materials and the design of the jacket, it must be recognized that plaster of Paris ($CaSO_4 \cdot 2H_2O$) consists of almost one-fourth of the element calcium, which is known as an opaque or absorptive element, causing the X-ray shadow given by bones and by pathological calculi containing calcium. Phosphorus also is a known opaque or absorptive element in X-ray practice. It is known, for example, that X-rays having a wave length of 1 angstrom unit are reduced in their intensity by more than 20,000 times when passed through one-fourth of one centimeter of calcium. Analogously, the same result occurs in passing through one centimeter of material consisting of one-fourth calcium. This may be recognized from the following equation:

$$I = I_0 e^{-ux}$$

where $I$ = intensity of rays penetrating
$I_0$ = initial intensity of the rays
$e$ = the natural number 2.7183
$u$ = the constant fraction for the absorber
$x$ = the thickness of the absorber in cms.

The element sulfur present in calcium sulfate likewise has a considerable power to absorb X-rays and the remainder of the compound which is chiefly oxygen, is relatively absorbent although not efficient at wave lengths as short as 1 angstrom.

The absorption properties of calcium sulfate fall off as the wave length of the radiation decreases and a wave length is eventually reached at which the compound is translucent to radiation rather than opaque. At this wave length, however, the human body also is transparent to such radiation.

Accordingly, shield material consisting of substantially pure calcium sulfate of sufficient thickness would provide substantial protection against that radiation which is absorbed by the human body with injurious results. Substantial protection will be obtained with a thickness of about one-half inch of calcium sulfate.

However, as calcium phosphate is readily available and easily incorporated as a filler material in the plaster of Paris blocks I prefer to incorporate from 20% to 40% by weight calcium phosphate in the plaster of Paris blocks of the present invention to provide the additional radiation absorption properties of the phosphorous to the block.

Other inorganic compounds containing radiation absorbing elements may be employed in place of calcium phosphate but one should avoid the incorporation of compounds containing lead or the heavy metals such as iron, nickel, cobalt, copper and the like. Aluminum and magnesium compounds, however, would be permissible as these do not scatter radiation or produce harmful secondary radiation as do lead and the heavy metals. Accordingly a small percentage of $Al_2O_3$ or $MgO$ and up to 10% thereof also increases the radiation absorption properties of the calcium sulfate block within the wave length of radiation absorbed by the human body.

In the manufacture of the plaster of Paris blocks $b$ for use in the radiation protective jacket of the present invention, a plurality of practices may be followed. The blocks $b$ may be formed or molded separately and to a precise or standard size or relatively large sheets of the blocks may be formed at once on a flexible backing such as cheesecloth, for easier handling or mounting in the jacket.

The jacket itself may consist of inner and outer fabric layers $a$ and $a''$ of weather and wear resistant materials or waterproof materials as desired and as heretofore employed in the art, the present invention residing primarily in the radiation absorbing filling between the inner and outer walls of the jacket and in the design and construction of the jacket to provide for the shielding of the vital organs of the wearer from that radiation normally absorbed by these organs with injurious results.

It is to be pointed out that the present invention does not contemplate or propose a shield effective to protect the body from radiation of all wave lengths. It proposes a radiation absorbing shield for that portion of the radiation to which the human body is opaque and absorbent with resultant harmful results. That radiation to which the human body is transparent or substantially so requires great thicknesses of material to absorb which is impractical to provide in a radiation protective jacket and in the present invention no interference with the passage of this radiation through the jacket or body is desired or contemplated to avoid completely the production of harmful secondary radiation.

Having hereinabove described the present invention broadly and specifically and having illustrated one specific embodiment thereof in the accompanying drawings, it is believed apparent that the same may be widely modified without essential departure therefrom and all such modifications thereof and departures therefrom are contemplated as may fall within the scope of the following claims.

What I claim is:

1. A radiation absorbent garment for protecting the body from radiation having a wavelength absorbed by the body, said garment having a size, shape and configuration adapting it to be disposed on the body and to enclose the body from the shoulders to the gonadal region and having inner and outer walls comprised of woven fabric and a non-rigid radiation absorbing shield disposed therebetween, said shield consisting of a plurality of pre-formed blocks sustained in aligned side relationship to each other, each said block having a thickness at least approximating one-half inch and consisting of a mixture of calcium sulfate and a filler material consisting of inorganic compounds increasing the opacity of the calcium sulfate to radiation having a wavelength absorbed by the body tissues without decreasing the transparency of the calcium sulfate to radiation not absorbed by the body tissues.

2. The garment of claim 1, said shield consisting of calcium sulfate containing an inorganic filler consisting of at least one of the materials calcium phosphate, $Al_2O_3$ and $MgO$.

3. The garment of claim 1, each said block consisting of calcium sulfate containing from 20% to 40%, by weight, calcium phosphate.

4. The combination of claim 1, wherein said pre-formed block consists of plaster of Paris containing from 20% to 40% calcium phosphate.

5. The combination of claim 1, wherein said pre-formed block consists of plaster of Paris containing from a small percentage up to 10% of one of the materials $Al_2O_3$ and $MgO$.

6. The combination of claim 1, wherein said pre-formed block consists of plaster of Paris containing from 20% to 40% calcium phosphate and from a small percentage up to 10% of one of the materials $Al_2O_3$ and $MgO$.

MARVIN WEINBERG.

References Cited in the file of this patent

UNITED STATES PATENTS

| Number | Name | Date |
| --- | --- | --- |
| 1,278,010 | Poetschke | Sept. 3, 1918 |
| 1,368,094 | Angebaud | Feb. 8, 1921 |
| 2,103,942 | Gillin | Dec. 28, 1937 |
| 2,387,597 | McLachlan, Jr. | Oct. 23, 1945 |